No. 742,831. PATENTED NOV. 3, 1903.
J. R. BRUNT & R. C. PITT.
PNEUMATIC TIRE.
APPLICATION FILED APR. 9, 1902.
NO MODEL.
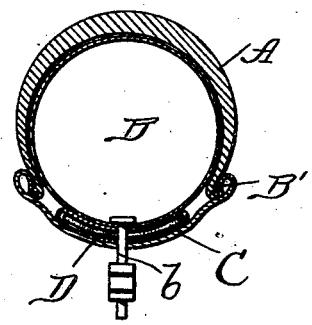
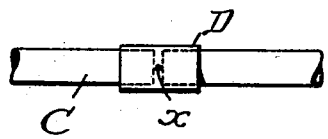
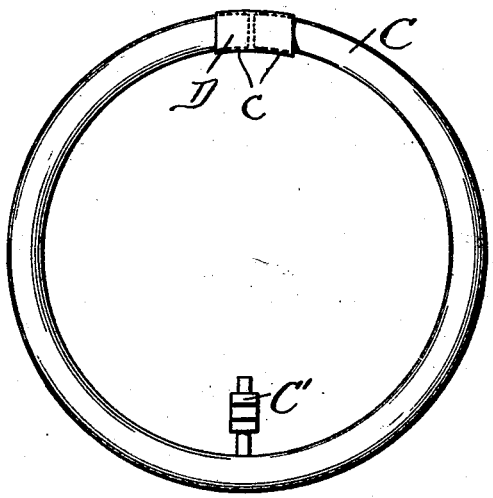
Attest:
O. Murtston
Edward Santon
Inventors:
John Russell Brunt,
Richard Charles Pitt.
by Richards & Co.
Attys.

No. 742,831. Patented November 3, 1903.

UNITED STATES PATENT OFFICE.

JOHN RUSSELL BRUNT AND RICHARD CHARLES PITT, OF CHRISTCHURCH, NEW ZEALAND.

PNEUMATIC TIRE.

SPECIFICATION forming part of Letters Patent No. 742,831, dated November 3, 1903.

Application filed April 9, 1902. Serial No. 102,081. (No model.)

*To all whom it may concern:*

Be it known that we, JOHN RUSSELL BRUNT and RICHARD CHARLES PITT, subjects of the King of Great Britain and Ireland, residing at Christchurch, New Zealand, have invented a new and useful Improvement in or Relating to Pneumatic Tires; and we do hereby declare the following to be a full, clear, and exact description of the same.

This invention provides means whereby cyclists and others using pneumatic tires may avoid the inconvenience due through having their tires punctured at a considerable distance from home.

The invention consists in the features and combination and arrangement of parts hereinafter described, and particularly pointed out in the claim.

In the accompanying drawings, Figure 1 is a sectional view of a tire fitted with an emergency-tube; and Fig. 2 is a view of a tube, showing the special form of joint. Fig. 3 is a detail plan view of the two ends of the emergency-tube with the connecting-sleeve.

A is the tire of the bicycle, containing the ordinary tube B, that is shown inflated.

C is the emergency-tube (shown deflated in Fig. 1) upon the rim B' of the wheel, with the valve $b$ of the ordinary passing through it.

In Fig. 2 the emergency is inflated and is provided with free ends $c\ c$, joined together by a coupling D, that is pierced, as at $x$, Fig. 3, so that the valve $b$ of ordinary tube can pass through without affecting the inflation of the tube.

$c'$ is the emergency-tube valve, that is held upon the rim of wheel in the ordinary manner.

Upon a puncture occurring to the ordinary tube it is only necessary to inflate the emergency. The ordinary then lies flat against the shoe of wheel and acts as a pad to the emergency, which will carry the rider safely in ordinary course until the puncture can be repaired.

Having now particularly described and ascertained the nature of our said invention and in what manner the same is to be performed, we declare that what we claim, is—

In combination with the ordinary pneumatic tire and the wheel-rim, an emergency-tire normally deflated and arranged between the rim and the ordinary tire, the said emergency-tire having its ends closed, a sleeve joining the said closed ends but forming no communication between them, and the valve-stem for the ordinary tire passing between the closed ends of the emergency-tire and through the said connecting-sleeve, substantially as described.

In testimony whereof we have signed this specification in the presence of two subscribing witnesses.

JOHN RUSSELL BRUNT.
RICHARD CHARLES PITT.

Witnesses:
P. M. NEWTON,
M. E. EYES.